March 31, 1970

R. GINESTE  3,504,291

ELECTRONIC PROPORTIONAL AND INTEGRAL CONTROLLER WITH
LIMITED SATURATION OF THE INTEGRAL ACTION

Filed March 13, 1967  2 Sheets-Sheet 1

United States Patent Office 3,504,291
Patented Mar. 31, 1970

3,504,291
ELECTRONIC PROPORTIONAL AND INTEGRAL CONTROLLER WITH LIMITED SATURATION OF THE INTEGRAL ACTION
Robert Gineste, Vitry-sur-Seine, France, assignor to Arca Premoncontrole, Gentilly, Val-de-Marne, France, a company of France
Filed Mar. 13, 1967, Ser. No. 622,564
Claims priority, application France, Mar. 21, 1966, 54,309
Int. Cl. G05b *11/14;* H03k *5/08*
U.S. Cl. 328—171                                 1 Claim

ABSTRACT OF THE DISCLOSURE

An electronic proportional and integral controller is compensated for signal input excursions beyond set limits by two threshold amplifiers fed with a portion of the output signal and each injecting a bucking component into the controller input when the upper or lower set limit is exceeded.

---

This invention relates to an electronic PI (proportional and integral) controller with limited saturation of the integral action.

The output signal from such controllers is of course determined by the proportional action, in dependence upon the deviation between the set value and the actual or measured value, and by the integral action, which is proportional in a finite time to the integral of the deviation. Accordingly, the controllers comprise a D.C. amplifier of a predetermined gain and a negative feedback chain in which the proportional and integral actions are produced. In this feedback chain, variation of the proportional action is obtained by potentiometric adjustment and variation of the integral action is achieved by variation of the resistance of a circuit in which an integrating capacitor is charged to a value corresponding to the controller output current, the integral action helping to restore the controlled value exactly to the set value, something which proportional action on its own cannot do, more particularly in systems having offset.

If for any reason, such as initial delays in the process being controlled or abnormal conditions of any element of the negative feedback chain or the like, the measured value exceeds the limits of the set-value scale, the integral action becomes saturated; since the set value cannot exceed the limits of the set-value scale, the deviation of the measured value from the set value at the controller input is greatly increased, with the result that the controller delivers, in accordance with the sense of the deviation, the intrinsically maximum or minimum output current which its amplifier can provide.

It is an aim of this invention to limit the saturation of the controller to an adjustable value between a top limiting value and a bottom limiting value for the particular output scale used, and to cancel the eeffcts of such saturation.

According to the invention, the controller comprises a circuit for compensating for variations of the signal representing the deviation of the actual or measured value from the set value of the controller beyond the limits of the set-value scale; and the compensating circuit is supplied with an adjustable proportion of the actuating voltage applied to the proportional and integral elements and controls the selective operation of two amplifiers each adapted to oppose the deviation signal with a voltage tending to cancel the effect of measurements which are outside the set-value scale.

The invention will be described hereinafter with reference to the accompanying drawings wherein.

Figure 1:
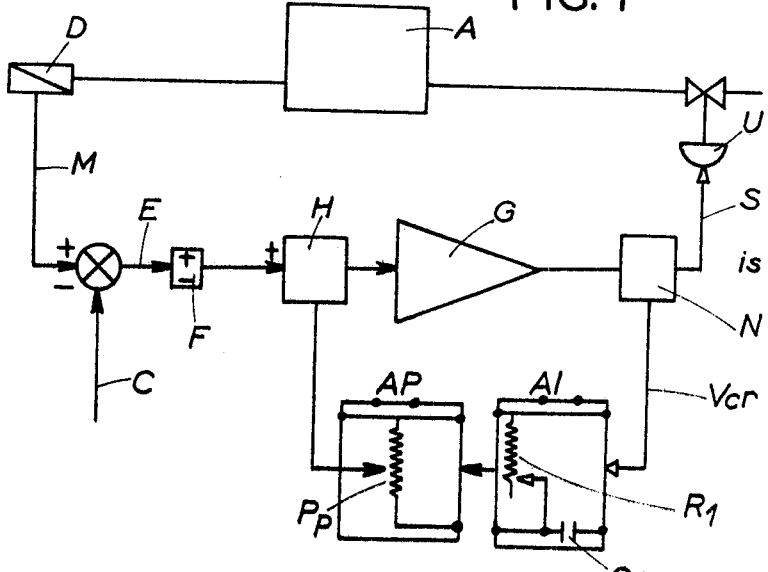
FIGURE 1 shows a diagram of an electronic PI controller.

FIGURE 1 shows an electronic controller controlling a process A. A measured value M delivered by a pickof D is compared with a set-value C. The variation or deviation on signal $E = M - C$, which is inverted at F, goes to a modulation bridge H at the input of an amplifier G. A converter N delivers an output signal S acting on a regulator U and applies a voltage $V_{CR}$ to a D.C. negative feedback chain comprising a potentiometer $P_p$ for adjusting the proportional action and a circuit $R_1C_1$ in which the resistance $R_1$ can be varied to adjust the integral action, the capacitor $C_1$ being charged to a value corresponding to the output current is. The proportional action produces for a signal $kE$, $k$ being a proportionality factor which is independent of time and of which the inverse expressed as a percentage is called the proportional band, which may for example have a value between 2% and 500%. The integral action, which has a time-constant $Ti$, produces a signal $$\frac{k}{Ti} \int E \, dt$$

i.e., a signal which is proportional over a finite time to the integral of the variation.

Figure 2:
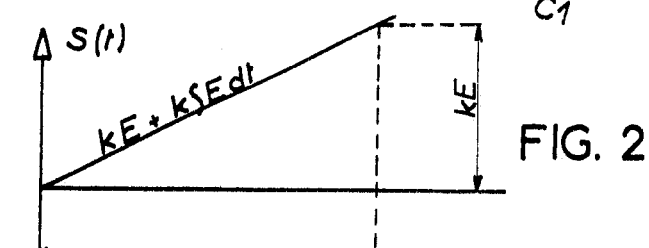
FIGURE 2 is a graph showing output signal value in dependence upon the proportional and integral actions.

The graph in FIGURE 2 shows the response $S(t)$ which a controller having a proportional band $1/k$ and an integrating time-constant $Ti$ makes to a variation step $E$.

Figure 3:
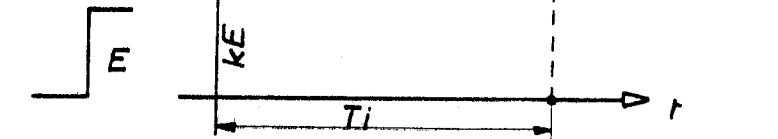
FIGURE 3 is a graph showing output signal variation for the case in which measurement exceeds the set-value scale limits, for a controller as shown in FIGURE 1, without saturation limitation.
Figure 3:
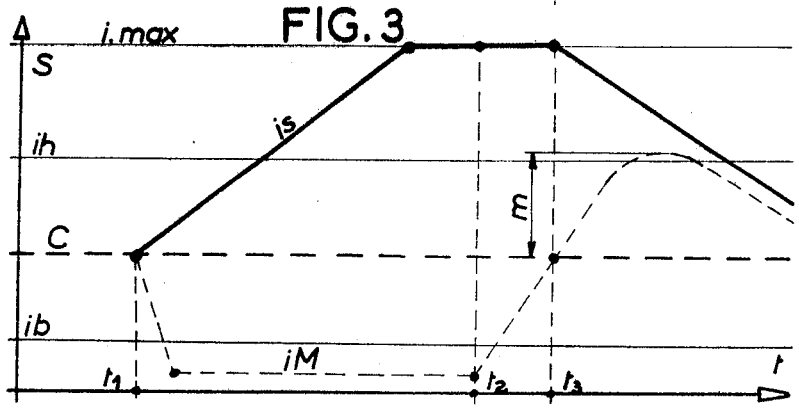

The graph in FIGURE 3 shows the variation of the output current is in the case in which the measured value M exceeds the limits of the set-value range of such a controller. In FIGURE 3, the set-value C is shown at the centre of the limiting values $i_h$ and $i_b$ of the set-value range.

Up to the time $t_1$ $M = C$ and it can be assumed that $M = C = S$. A discontinuity event, such as the drop of the controlled variable to its minimum value, occurs at the time $t_1$ and the actual-value current $iM$ also drops to its minimum possible value. The actual value M decreases with a slope which depends upon the time constants between disturbance location and the controller. On the other hand, S increases, in accordance with the values of $1/k$ in percentage value and of $Ti$ in minutes for which the controller is set; the worst case for the particular event considered results from a wide proportional band—i.e., a small factor $k$—and a slow integrating action—i.e., an integrating time-constant $Ti$ of the order of several minutes.

It can be assumed that the event to which the actual-value current $iM$ corresponds lasts long enough for the output current is to reach its maximum value $i.max$—i.e., for the integrating capacitor $C_1$ (FIGURE 1) to become fully charged.

If the event disappears at the time $t_2$, the actual-value current $iM$ increases, and when the actual value reaches the set value C at the time $t_3$, the deviation E reverses and the output current is starts to decrease. The actual or measured value M goes on increasing until it reaches the value S of the output signal, whereupon the control loop comes into balance, the balance bringing the actual value and the output signal towards the set value C at a rate which is a function of the control loop. The shift $m$ of the measured value relatively to the set value can be very large and may greatly disturb process control.

The invention helps to obviate the shift $m$ in most control settings, more particularly up to a 500% proportional band and a 30-minute integrating time-constant.

Figure 4:
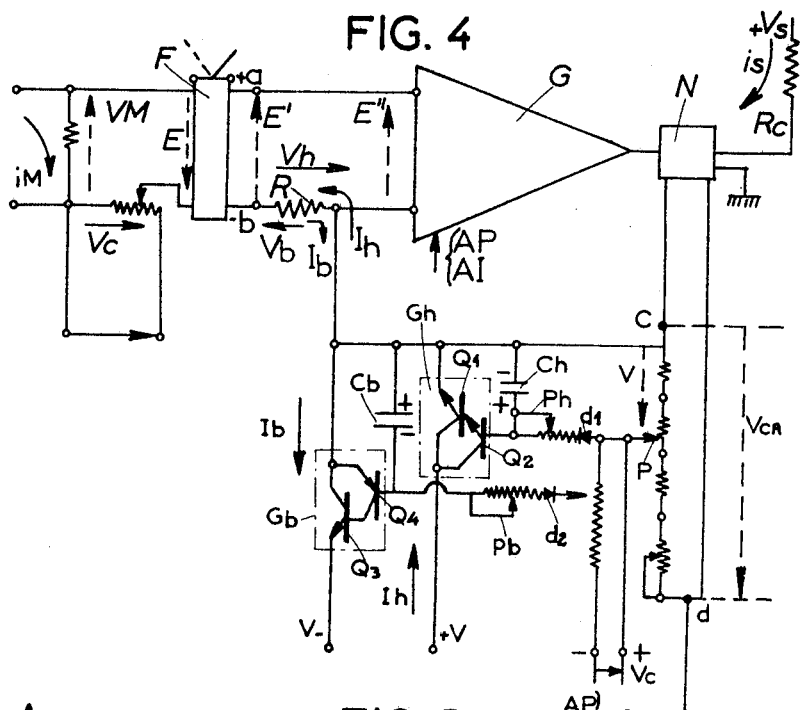
FIGURE 4 is a diagram showing a controller of the kind shown in FIGURE 1 and comprising a saturation-limiting circuit.

To this end, the negative feedback chain comprises a compensating circuit which is shown in FIGURE 4 and which limits the degree of saturation of the controller amplifier. The negative feedback chain which determines the proportional and integral actions receives from the output converter N of the controller a voltage proportional to the D.C. output voltage $V_{CR}=k'is$. The latter voltage is applied to the terminals C and $d$ of a potentiometric divider P which enables an adjustable proportion V of the voltage $V_{CR}$ to be taken. A first amplifier $Gh$ formed by NPN silicon transistors $Q_1$ and $Q_2$ can deliver to a resistance R between output $b$ of inverter F and terminal $c$ a current $I_h$ such that $I_h=Kv$. The direction in which the current $I_h$ flows in the resistance R is such as to produce a voltage $V_h$ which opposes the voltage E′ when $V_M<V_{c'}$, as is the case in the particular example being considered. Consequently, when the actual-value current $iM$ decreases to its minimum, the deviation E′ becomes very large and a voltage $Vh$ bucks E′ so that $E'-Vh$ causes the controller to deliver a maximum output current is which can be adjusted by means of the potentiometer P and which is less than the intrinsic maximum current $i.max$.

Figure 5:
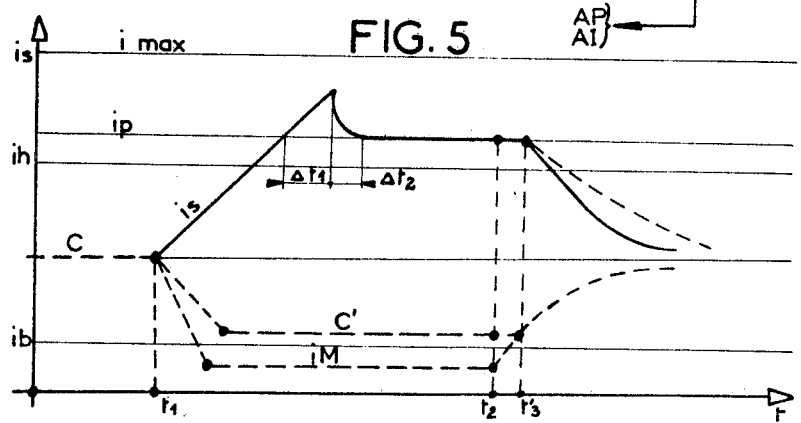
FIGURE 5 is a graph similar to FIGURE 3 and showing output signal variation in a controller of the kind shown in FIGURE 4.

The input to the amplifier $Gh$ comprises an adjustable delay circuit comprising an adjustable resistor $Ph$ and a capacitor $Ch$; when the voltage $v$ reaches the threshold value of the amplifier $Gh$, the current is exceeds the saturation value $ip$ controlled by P during a time $\Delta t_1$ which corresponds to the charging of $Ch$ through $Ph$; the current is resumes its upper set value $ip$ after a time $\Delta t_2$ corresponding to the coming into operation of the amplifier $Gh$, whereafter the controller operates as if there existed a "false set value" C′ which follows the measured value (FIGURE 5).

When the event causing the actual-value current $iM$ ceases at the time $t_2$, the actual value current $iM$ rises and meets the false set value C′ at the time $t'_3$ such that $t'_3-t_2<t_3-t_2$. At this time the deviation E″ at the controller input changes sign and is starts to decrease.

Since the drive voltage for the amplifier $Gh$ is the voltage across the capacitor $C_h$, the latter voltage, which is isolated from potentiometer P by the interposition of a diode $d_1$, discharges through the very high input impedance of the amplifier and tends to keep the current $I_h$ flowing through the resistance R after the voltage V has dropped below the amplifier threshold voltage. Consequently, an increased deviation E″ corresponding to a fictional reduction of the proportional band appears at the controller input, with the result that the rate of decrease of the current is greater than it would normally be if caused solely by the reduction of the voltage V. If the delay is controlled by means of $Ph$, the actual-value current $iM$ can be grought back to the set-value C without exceeding this level for any given control action in a given process which it is required to control.

The compensating circuit also comprises an amplifier $G_b$ formed by transistors $Q_3$, $Q_4$ whose input comprises an adjustable delay circuit comprising a potentiometer $Pb$ and a capacitor $Cb$.

When the output current is drops to a value below the lower set value $i_b$, the voltage V decreases and the input voltage of the amplifier $G_b$—i.e., the voltage $Vc-V$— increases and reaches the threshold level of the amplifier. The amplifier applies across the resistance R a current $I_b$ which produces a voltage $V_b$ opposing the voltage E′, which has reversed, so that $-E'+V_b$ causes the controller to deliver a current is between 0 and $ib$. The return of the actual value to the set value is supervised by the delay circuit of the amplifier $G_b$, the diode $d_2$ operating in exactly the same way as the diode $d_1$ in the input circuit of the amplifier $Gh$.

Figure 6:
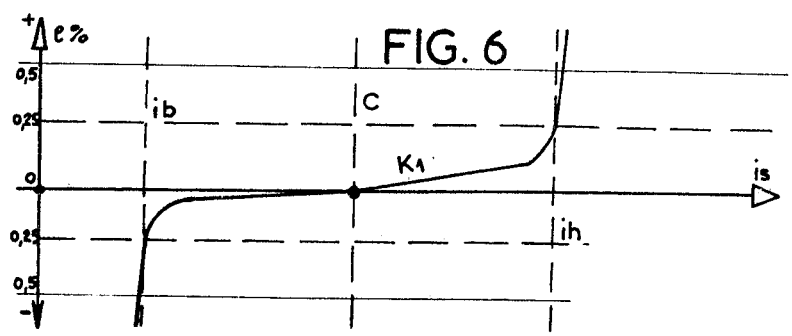
FIGURE 6 is a graph showing output signal stability in the control range between the limit values of the set-value scale.

The amplifiers $Gh$, $Gb$ have a high current gain so as not to disturb the control range between $i_h$ and $i_b$ (FIGURE 6). In normal conditions—i.e., provided that the measured value does not depart from the control range—$I_h$ and $I_b$ are just the normal inoperative currents drawn by the transistors $Q_1$, $Q_3$ of the amplifiers $Gh$ and $Gb$.

The invention is not of course limited to the embodiment hereinbefore described, which can be modified or supplemented by any useful ancillary facilities without departure from the scope of the invention.

The invention is of use more particularly with any continuous electronic control system of the PI kind.

What is claimed is:

1. An electronic proportional and integral controller with limited saturation of the integral action comprising a circuit compensating for variations of the deviation signal representing the deviation of the measured value from the set value of the controller beyond the limits of the set value scale, means for supplying the compensating circuit with an adjustable proportion of the actuating voltage applied to the proportional and integral elements, the compensating circuit controlling the selective operation of two amplifiers, each amplifier opposing the deviation signal with a voltage tending to cancel the effect of measurements outside the set value scale, the compensating circuit including a potentiometer adjusting the amplifier operating threshold voltage and determining the controller saturation limits, each of the amplifiers in the compensation circuit including a control transistor connected to a delay circuit, a capacitor in the delay circuit connected to one side of a diode through a potentiometer, the diode and the capacitor being connected to the base of the control transistor, the control transistors of the amplifiers being oppositely oriented, the capacitor discharging through the entry impedance of the amplifier and the delay circuits preventing saturation of the integral action and maintaining the cancelling voltage opposed to the deviation signal.

References Cited

UNITED STATES PATENTS

| | | | |
|---|---|---|---|
| 3,197,711 | 7/1965 | Richardson | 330—103 |
| 3,221,257 | 11/1965 | Ohlson | 328—3 |
| 3,377,548 | 4/1968 | Newbold | 323—100 |
| 3,413,561 | 11/1968 | Hogan | 330—9 |

JOHN S. HEYMAN, Primary Examiner

HAROLD DIXON, Assistant Examiner

U.S. Cl. X.R.

307—237; 328—1